(12) United States Patent
Daimer et al.

(10) Patent No.: US 7,730,483 B2
(45) Date of Patent: Jun. 1, 2010

(54) STORAGE OF PROJECT-PLANNING DATA IN AN AUTOMATION SYSTEM

(75) Inventors: Martin Daimer, Erlangen (DE); Ludwig Karl-Dietze, Heroldsberg (DE); Andreas Macher, Neumarkt (DE); Siegfried Prieler, Tapfheim (DE)

(73) Assignee: Siemens Aktiengesellschaft, Munich (DE)

( * ) Notice: Subject to any disclaimer, the term of this patent is extended or adjusted under 35 U.S.C. 154(b) by 1078 days.

(21) Appl. No.: 11/191,541

(22) Filed: Jul. 28, 2005

(65) Prior Publication Data

US 2006/0026553 A1 Feb. 2, 2006

(30) Foreign Application Priority Data

Jul. 30, 2004 (EP) .................................. 04018121

(51) Int. Cl.
*G06F 9/445* (2006.01)
*G06F 9/45* (2006.01)

(52) U.S. Cl. .................... 717/177; 717/147; 717/149

(58) Field of Classification Search ........................ None
See application file for complete search history.

(56) References Cited

U.S. PATENT DOCUMENTS

| 5,774,728 A * | 6/1998 | Breslau et al. .............. 717/141 |
| 2002/0059567 A1 | 5/2002 | Minamide et al. |
| 2003/0014440 A1 | 1/2003 | Bussert et al. |
| 2004/0088279 A1 | 5/2004 | Atzmueller et al. |
| 2005/0015398 A1 | 1/2005 | Schlereth et al. |

FOREIGN PATENT DOCUMENTS

| DE | 101 16 809 A1 | 5/2002 |
| DE | 101 38 533 A1 | 7/2002 |
| EP | 1 186 971 A2 | 3/2002 |
| WO | WO 02/073326 A2 | 9/2002 |
| WO | WO 03/040842 A1 | 5/2003 |

OTHER PUBLICATIONS

English translation of WO02073326 (A3), published on Jun. 26, 2003, p. 1-5, retrieved from EPO website [www.epoline.org] on Dec. 23, 2008.*

* cited by examiner

*Primary Examiner*—Tuan Q Dam
*Assistant Examiner*—Zheng Wei

(57) ABSTRACT

The invention relates to a system and also method for storage of project-planning data in an automation system containing automation devices. To simplify changes within the automation system the project-planning data is stored in a generic, expandable data storage format, with parts of the project-planning data being assigned runtime data in each case, with the runtime data being assigned at least one automation device in each case, with the runtime data being executable parts of programs on the automation devices assigned to it and with the parts of the project-planning data being stored distributed in parallel to the runtime data assigned to it in each case in the automation devices assigned to the runtime data in each case.

14 Claims, 1 Drawing Sheet

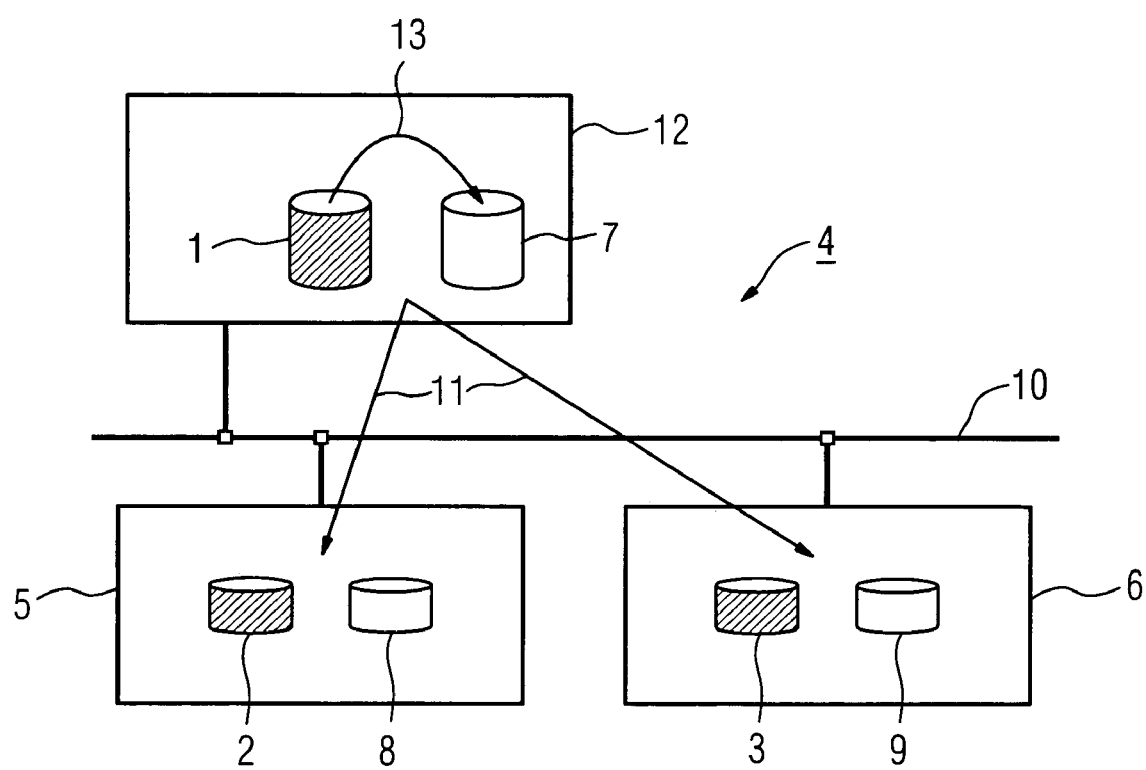

STORAGE OF PROJECT-PLANNING DATA IN AN AUTOMATION SYSTEM

CROSS REFERENCE TO RELATED APPLICATIONS

This application claims priority to the European application No. 04018121.6, filed Jul. 30, 2004 and which is incorporated by reference herein in its entirety.

FIELD OF INVENTION

The invention relates to a system as well as to a method for storage of project-planning data in an automation system containing automation devices.

SUMMARY OF THE INVENTION

In the programming of automation systems, especially industrial automation systems, a distinction is usually made between project-planning data and runtime data. Project-planning data arises in the engineering process, e.g. through programming and project planning, and is converted in a compilation run into a form (e.g. a module) which can in its turn be interpreted on the runtime side in order to define the behavior of the automation system there. In the compilation of the project-planning data only the data necessary for the definition of the runtime system behavior is packed and loaded into modules as a rule. In addition the option is provided for the engineering system to store data not relevant to the execution sequence in runtime objects which are not interpreted on the runtime side. Project-planning data occupies more memory space than the corresponding runtime data by several orders of magnitude. Because of the high demand for non-volatile memory space the project-planning data is therefore usually stored separately from the runtime data on programming devices or computers, since an individual automation device does not as a rule have sufficient memory space to be able to store the information which contains a complete automation project. The result of this physical separation of project-planning data and runtime data is that programs can only be modified and errors rectified on the automation system if the project appropriate to the automation system is available with the corresponding project-planning data.

EP 1 186 971 A2 describes an automation system with automation devices for control and/or regulation of a technical system which can be operated by electronic data processing means, where project-planning data of the system is to be processed in the automation system. A storage medium, e.g. a memory card, is available for the project-planning data which is assigned to the relevant Central Processing Unit (CPU) of an automation device.

The object of the invention is to simplify modifications made within an automation system.

This object is achieved by claims according to a system. In accordance with the invention a system is proposed for storage of project-planning data in an automation system containing automation devices, with the project-planning data being stored in a generic, expandable data storage format, with parts of the project-planning data being assigned runtime data in each case, with the runtime data being assigned at least one automation device in each case, with the runtime data being executable program parts on the automation devices assigned to it, with the parts of the project-planning data being stored distributed in parallel to the runtime data assigned to it in each case in the relevant automation devices assigned to the runtime data.

The object is further achieved by claims according to a method. In the inventive method for storage of project-planning data in an automation system containing automation devices the project-planning data is stored in a generic, expandable data storage format, parts of the project-planning data are assigned runtime data in each case, the runtime data is assigned to at least one automation device in each case, the runtime data on automation devices assigned to it is executable program parts, the parts of the project-planning data are stored distributed in parallel to the runtime data assigned to it in each case in the relevant automation devices assigned to the runtime data.

Runtime data is currently already stored distributed within an automation system. Each automation device receives the runtime data with which it is either to work or which it is to distribute to other automation devices which do not have any non-volatile memory of their own. The idea underlying the invention is that of also distributing the project-planning data associated with the runtime data in parallel to this runtime data on the different automation devices. This gives even and decentralized utilization of the memory space available in the automation system. The risk is thus reduced of a storage bottleneck arising in an individual automation device. The advantage for the user is that the runtime data and the assigned project-planning data form one unit. The data can be processed independently even if communication problems occur. It is thus possible to update a program on an automation device even if communication with all other parts of the automation system is not possible. A service engineer can thus copy modifications onto the corresponding automation device without any problems. Once communication within the automation system is fully functional again, the modifications copied in are automatically also included in the overall project planning of the automation system. From an internal standpoint it is advantageous for the load of the additional project-planning data to be able to be evenly distributed over all automation devices. This reduces the demands which would have to be imposed for central data storage as regards resource requirements and performance (both communications performance and also performance for a runtime access to the project-planning data) on each individual automation device. The hardware costs of an automation device can thus be reduced by the invention.

Since any number of clients from different manufacturers must access the project-planning data, a proprietary form of data representation is not suitable, as explained below. Usually project-planning data is stored encoded on the automation system in a format which is specific to and individually selectable for the creation software Tool software wishing to access this data must initially be in a position to be able to decode this data format. Furthermore it must also be able to interpret this data. Because of the effort associated with achieving both these requirements and because of the resulting dependency of specific creation formats, which can change at any time, this has not previously been the case. The fact that there is no project-planning data available in a generic format means that previously many applications which required access to project-planning data could not be implemented. The problem has been circumvented previously by defining special solutions for applications; Here specific data in addition to the runtime data is stored on the automation system in a format agreed between the two partners. This is however not a satisfactory state of affairs: On the one hand for each new request a new storage format and a new storage location (online shell object, which accommodates the data) must be defined, on the other these interfaces are again only agreed between two partners. Neither the interpretation of the stored data nor the scope of the stored data is accessible to a further user without renewed effort and without incompatibility.

The invention solves the problem by storing the project-planning data in a generic, expandable and end-to-end format directly on the automation system. The format makes it possible for any tools to understand this data and be able to expand it independently so that it remains consistent. Since the project-planning data is stored in accordance with the invention in a generic, expandable data storage format, project-planning data present in the automation system can be expanded generically. New, additional data of an existing part of the project-planning data, resulting for example from another program which also uses this part of the project-planning data, can easily be inserted, without the original project-planning data having to be modified. Since the data format is generic it can be utilized by any given project-planning systems, without these systems needing specific knowledge about particular proprietary data formats. Previous project planning can thus be used as input, the data does not have to be entered again and can possibly be used for default settings. Data from previous programming can continue to be used, e.g. for symbolic programming It is also possible to refer back to existing standards.

In accordance with an advantageous embodiment of the invention, all parts of the project-planning data are assigned to the corresponding runtime data in each case and all parts of the project-planning data are stored distributed in parallel to the runtime data assigned to it, in the relevant automation devices assigned to the runtime data in each case. This means that it is thus possible to store the project-planning data completely in the automation system or in the automation devices of the automation system. When a user loads runtime data into an automation system the project-planning data associated with the runtime data is also automatically stored by the system as well. This means that storage on other media, e.g. the hard disk of a PC or backup media such as a CD-ROM or a DVD is only required for data backup purposes.

If parts of the project-planning data which are assigned to a plurality of runtime data are stored on the automation devices assigned to this plurality of runtime data in each case, the runtime data and project-planning data suitable for the relevant automation device is always available to a user for operations involving modifying or expanding the runtime data of an automation device, even in the event of a communication fault in the automation system. Since this data is stored directly in the automation device there is no necessity for the user to store this data on an external programming device. He can connect such a programming device to the relevant automation device and is in a position to work directly with the project-planning data suitable for this automation device.

In order to always have the project-planning data relevant to an automation device available on a local device in the event of communication problems, it is proposed in accordance with a further advantageous embodiment of the invention that part of the project-planning data which is not to be assigned to any runtime data be stored on all automation devices in each case the project-planning data not to be assigned to an automation device will thus be stored redundantly on all automation devices. This increases the storage load for the individual automation devices somewhat, but enables changes to be made at any automation device even if there is no communication link to the communication network of the automation system.

In accordance with a further advantageous embodiment of the invention the data storage format is determined by a predefined object model, represented by a project tree, and by schema definition files. A data storage format defined in this manner enables any tools which use the project-planning data to interpret said data.

The constant availability of the project-planning or runtime data for modification and updating is ensured if, in accordance with a further advantageous embodiment of the invention, the project-planning data is stored consistently with the runtime data assigned to it in each case. In such a case the concept of storing the project-planning data at the associated originator simplifies the process of ensuring consistency.

Since the project-planning data is stored in a generic, expandable data storage format, in accordance with a further advantageous embodiment of the invention there is provision for the project-planning data to be used for exchange of data between applications. In this embodiment a first application converts data into the data storage format of the project-planning data and stores this on the relevant automation device. From there the stored project-planning data can in turn be read in the data storage format by a second application and converted into a format which can be used for it.

The storage space requirement of an automation device in an automation system is reduced if the project-planning data is stored in a further advantageous embodiment of the invention in compressed form.

Known mechanisms from business applications can be used in accordance with a further advantageous embodiment of the invention if the data storage format is defined in an extensible markup language, especially the standardized format XML (XML=Extensible Markup Language).

BRIEF DESCRIPTION OF THE DRAWING

The sole FIGURE shows an exemplary embodiment of the invention.

DETAILED DESCRIPTION OF THE INVENTION

The invention is described and explained in more detail below on the basis of the exemplary embodiment shown in the FIGURE. The FIGURE shows an automation system 4 which contains automation devices 5, 6, linked over a communication network 10, e.g. a bus system. A computer 12, e.g. a mobile programming device, is also connected to the communication network 10. The computer 12 is not itself part of the automation system 4. With the aid of the computer 12 a user creates project-planning data 1, which is converted in a conversion step 13 into runtime data 7. The runtime data 7 contains executable program parts which for example represent a control program within the automation system 4. The project-planning data 1 is available in a generic, expandable data storage format. Parts 2, 3 of the project-planning data 1 are each assigned specific parts 8, 9 of the runtime data 7. The parts 8, 9 of the runtime data 7 are in their turn each assigned to an automation device 5 or 6. The arrows identified by the reference symbol 11 are used to indicate the process of storing the parts 2, 3 of the project-planning data or the parts 8, 9 of the runtime data. The parts 2, 3 of the project-planning data are stored distributed in this case in parallel to the runtime data 8, 9 assigned to them in each case in the automation devices 5, 6 assigned to the runtime data 8, 9 in each case.

A further exemplary embodiment is the commissioning of an industrial automation system. To perform this operation a user creates a new project in a project-planning system. The project-planning data is created, modules are programmed and then the project-planning data together with the runtime data is stored on the automation system. When this is done the project-planning data is converted into a generic format, assigned to the appropriate runtime system, packed into modules and loaded. The complete project-planning information is thus now available in the automation system. If further actions are now to be performed with the automation system (maintenance, repair, expansion, operation and monitoring etc.) any applications can access the available project-planning data. Unlike in the prior art, the applications do not need any knowledge about internal data storage structures, not can the situation arise in which important data is missing because it has simply not been stored with the other data. A simple interpretation of the project-planning data stored in the automation system in the memories of the automation devices is sufficient: Each item of information which was present in the project-planning data is also present here.

In summary the invention thus relates to a system as well as to a method for storage of project-planning data 1, 2, 3 in an automation system 4 which contains automation devices 5, 6. To simplify changes within the automation system 4, the project-planning data 1, 2, 3 is stored in a generic, expandable data storage format, with parts of the project-planning data 1, 2, 3 being assigned runtime data 7, 8, 9 in each case, with the runtime data 7, 8, 9 being assigned at least one automation device 5, 6 in each case, with the runtime data 7, 8, 9 being executable parts of programs on the automation devices 5, 6 assigned to it and with the parts of the project-planning data 1, 2, 3 being stored distributed in parallel to the runtime data 7, 8, 9 assigned to it in each case in the automation devices 5, 6 assigned to the runtime data 7, 8, 9 in each case.

The invention claimed is:

1. A system for storing project-planning data in an automation system comprising
  a programming device connected to a communication network of an automation system of a plurality of automation devices, the programming device adapted to convert original project-planning data for overall project planning of the automation system comprising data arising through programming and planning in the engineering process into runtime data for the automation system;
  the programming device further adapted to:
    convert the original project-planning data for overall project planning of the automation system from a proprietary, form into generic project-planning data comprising a generic extensible data storage format represented by a project tree and schema definition files enabling applications to interpret the generic project-planning data and expand the project-planning data generically without modifying the original project-planning data;
    assign respective parts of the generic project-planning data comprising generic project-planning data modules to respective parts of the runtime data comprising executable program modules;
    assign the respective parts of the runtime data comprising executable program modules to a respective automation device; and
    distributively store in parallel the respective parts of the generic project-planning data comprising generic project-planning data modules and the respective parts of the runtime data comprising executable program modules in each of the respective automation devices independently, thereby providing decentralized utilization of memory space in the automation system and reducing reliance on communication with the automation system when working with the generic project-planning data of a particular automation device, wherein parts of the generic project-planning data which are not to be assigned to any particular runtime data are stored on all automation devices.

2. The system in accordance with claim 1, wherein the generic extensible data storage format comprises a predefined object model, represented by a project tree and by schema definition files.

3. The system in accordance with claim 1, wherein the generic project-planning data is stored such that the generic project-planning data is consistent with the runtime data assigned to it.

4. The system in accordance with claim 1, wherein the generic extensible data storage format is used for exchange of application data between applications by allowing application data to be stored in the generic extensible format in one device and read by another application.

5. The system in accordance with claim 1, wherein the generic project-planning data is stored in compressed form.

6. The system in accordance with claim 1, wherein the generic extensible data storage format is defined in an extensible markup language.

7. The system in accordance with claim 6, wherein the extensible markup language is eXtensible Markup Language XML.

8. A method for storing project-planning data in an automation system comprising:
  converting, by a programming device connected to a communication network of an automation system of a plurality of automation devices, original project-planning data for overall project planning of an automation system comprising data arising through programming and planning in the engineering process for the automation system into runtime data for the automation system;
  converting the original project-planning data for overall project planning of the automation system from a proprietary form into generic project-planning data comprising a generic extensible data storage format represented by a project tree and schema definition files enabling applications to interpret the generic project-planning data and expand the project-planning data generically without modifying the original project-planning data;
  assigning respective parts of the generic project-planning data comprising generic project-planning data modules to respective parts of the-runtime data comprising executable program modules;
  assigning respective parts of the runtime data comprising executable program modules to a respective automation device; and
  distributively store in parallel the respective parts of the generic project-planning data comprising generic project-planning data modules and the respective parts of the runtime data comprising executable program modules in each of the respective automation devices independently, thereby providing decentralized utilization of memory space in the automation system and reducing reliance on communication with the automation system when working with the generic project-planning data of a particular automation device, wherein parts of the generic project-planning data which are not to be assigned to any particular runtime data are stored on all automation devices.

9. The system in accordance with claim 8, wherein the generic extensible data storage format comprises a predefined object model, represented by a project tree and by schema definition files.

10. The system in accordance with claim 8, wherein the generic project-planning data is stored such that the generic project-planning data is consistent with the runtime data assigned to it.

11. The system in accordance with claim 8, wherein the generic extensible data storage format is used for exchange of application data between applications by allowing application data to be stored in the generic extensible format in one device and read by another application.

12. The system in accordance with claim 8, wherein the generic project-planning data is stored in compressed form.

13. The method in accordance with claim 8, wherein the generic extensible data storage format is defined in an extensible markup language.

14. The method in accordance with claim 13, wherein the extensible markup language is eXtensible Markup Language XML.

\* \* \* \* \*